United States Patent [19]

Bolliger

[11] 4,000,607
[45] Jan. 4, 1977

[54] FLUID CONTROL VALVE AND METHOD
[75] Inventor: Frederic E. Bolliger, Phoenix, Ariz.
[73] Assignee: The Garrett Corporation, Los Angeles, Calif.
[22] Filed: Nov. 7, 1975
[21] Appl. No.: 629,737
[52] U.S. Cl. .............................. 60/39.03; 137/117; 137/625.3; 137/599; 137/448; 60/39.28 R
[51] Int. Cl.² ...................... F02C 9/10; F02C 9/08
[58] Field of Search ................... 60/39.03, 39.28 R; 137/115, 117, 599, 527, 521, 448, 625.28, 625.3; 251/302

[56] References Cited
UNITED STATES PATENTS

| | | | |
|---|---|---|---|
| 3,078,669 | 2/1963 | Williams | 60/39.28 R |
| 3,350,880 | 11/1967 | McCombs | 60/39.28 R |
| 3,390,522 | 7/1968 | Whitehead | 60/39.28 R |
| 3,411,291 | 11/1968 | Tyler | 60/39.28 R |
| 3,430,654 | 3/1969 | Mills | 137/625.28 |
| 3,538,707 | 11/1970 | Karol | 60/39.28 |

Primary Examiner—Clarence R. Gordon
Attorney, Agent, or Firm—James W. McFarland; Albert J. Miller

[57] ABSTRACT

Method and apparatus for metering fuel flow to a gas turbine engine includes a first bifurcated movable metering element straddling a pair of opposed metering openings and shiftable to adjust the area of the openings to vary fuel flow from a pump to the combustion chamber of the engine. A second bifurcated movable metering element straddles a second pair of opposed metering openings to adjust fuel flow back to the inlet of the pump in bypassing relationship to the combustor. The movement of the second metering element is responsive to the pressure differential across the first metering openings to maintain this pressure differential substantially constant to allow precise fuel metering by movement of the first metering element.

15 Claims, 8 Drawing Figures

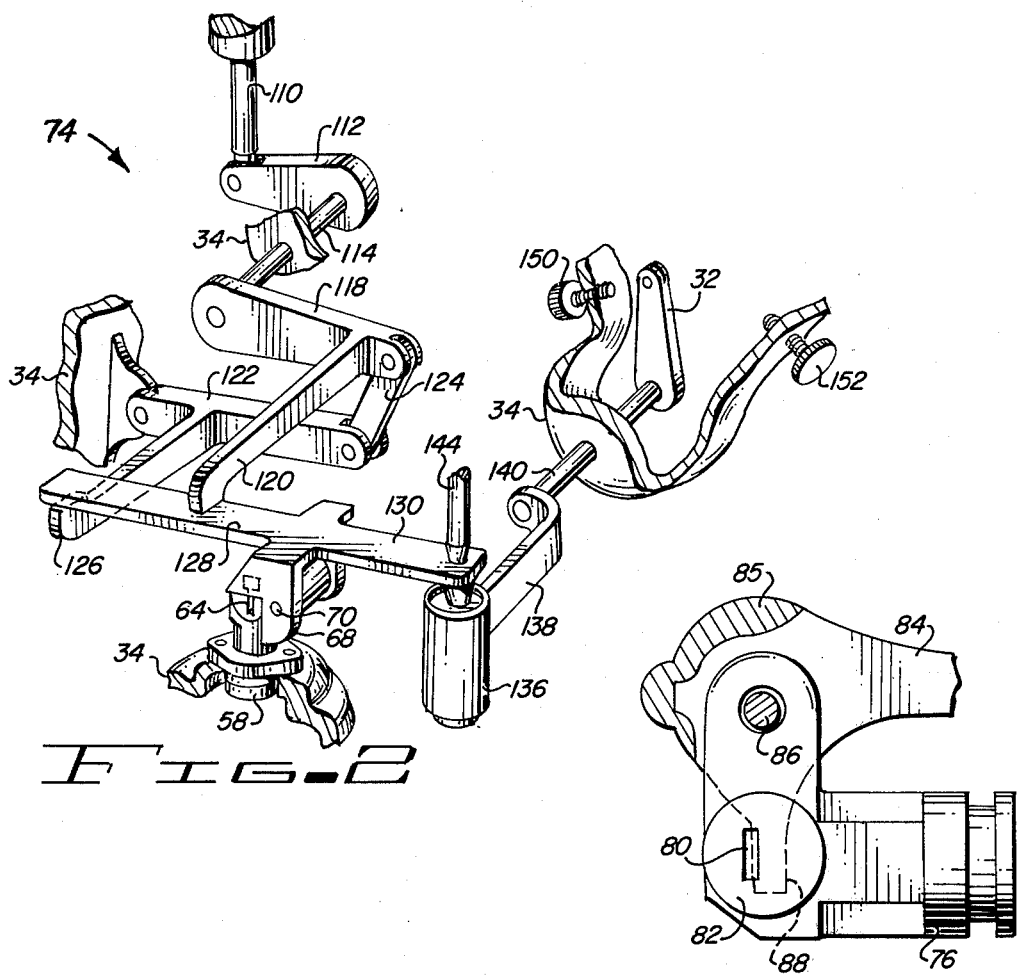
FIG-2
FIG-4
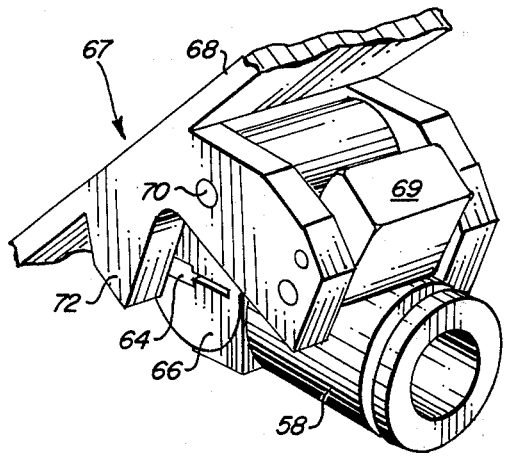
FIG-3
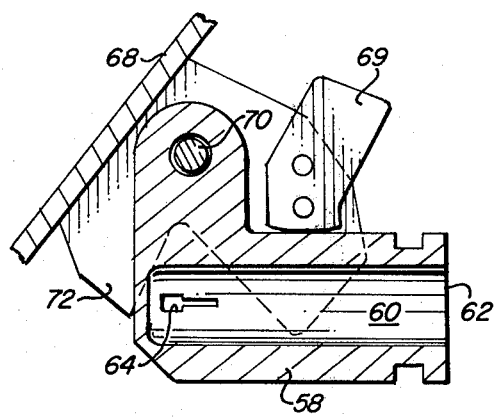
FIG-5

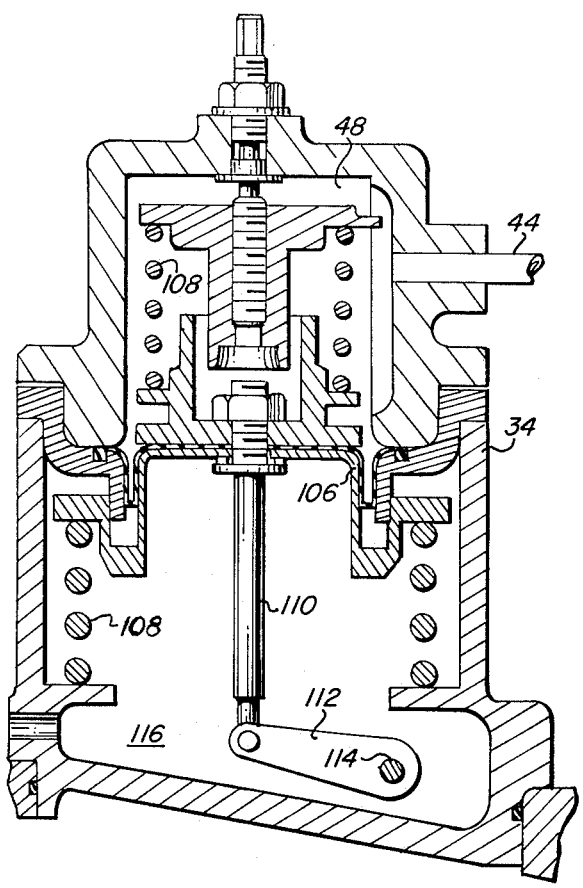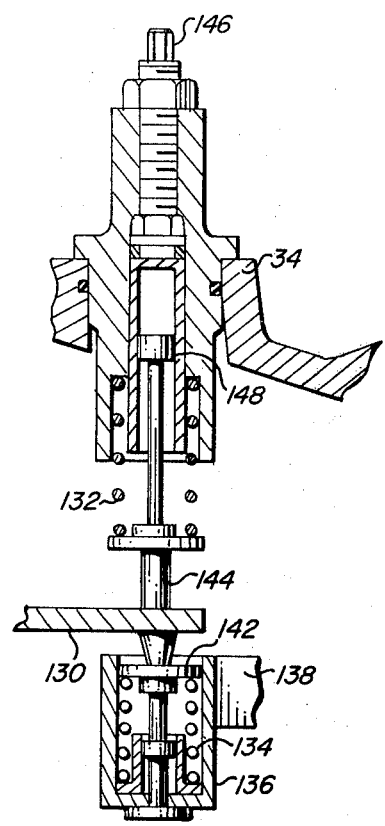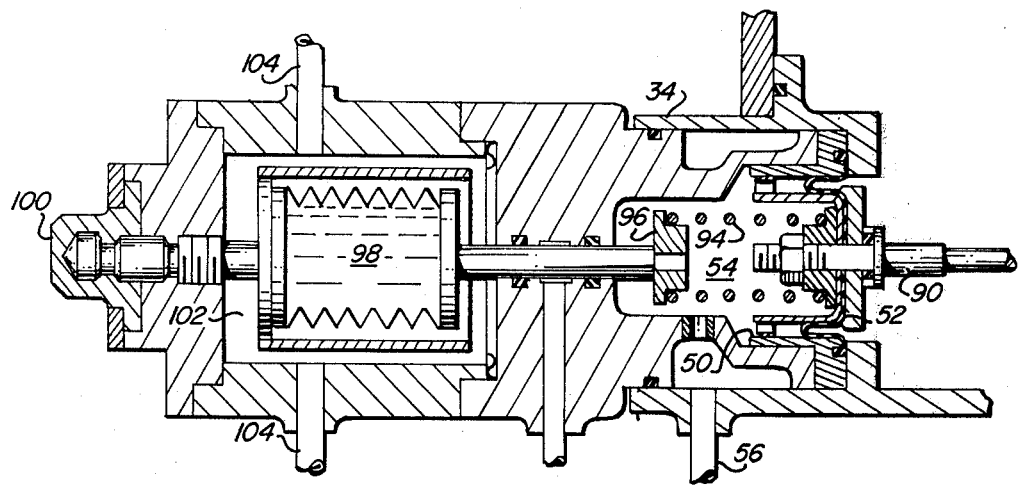

FLUID CONTROL VALVE AND METHOD

BACKGROUND OF THE INVENTION

The invention herein was made in the course of or under a contract with the Department of the Navy.

This invention pertains to fluid control instrumentality and relates more particularly to an improved apparatus and method for controlling fluid fuel flow to a gas turbine engine. More specifically, the invention relates to fluid control valve structure as described in U.S. Pat. No. 3,805,835 of Harvey B. Jansen.

The above referenced patent describes a fluid control valve structure which utilizes a bifurcated clevis element that is shiftable across a pair of opposed metering orifices to precisely control fluid flow. In comparison to other types of control valves, the structure referred to reduces the tendency of the metering orifices to clog with contaminants, minimizes mechanical hysteresis of the valve, reduces effort required in actuating the valve, and provides a balanced flow arrangement which substantially reduces power consumed by the valve and produces excellent frequency response characteristics.

SUMMARY OF THE INVENTION

The present invention includes such a clevis valve arrangement for adjustably covering and uncovering opposed metering openings to vary the rate of fuel flow to a gas turbine engine. The clevis provides balanced flow through the opposed openings such that the clevis is force-balanced to reduce effort force required to move the clevis, and to eliminate mechanical hysteresis in the valve. An input signal to the clevis dictates the thrust desired from the gas turbine engine, and in response to pressure of gas flow being fed to the combustion chamber of the gas turbine engine, actual movement of the clevis is controlled through a desired acceleration or deceleration schedule to prevent surge in the turbine engine and combustion flame-out. For precise fuel metering control and elimination of any hysteresis effects, a second clevis control element is disposed to cover and uncover a second pair of opposed metering openings to control bypass fluid fuel flow passing from the source of fluid back to the inlet of the source in bypassing relationship to the combustion chamber. The second clevis acts similarly to the first clevis, but is automatically positioned by fluid pressure responsive means. The automatic positioning is in response to the sensed pressure differential across the first pair of opposed metering openings such that a substantially constant pressure differential across the first metering openings is maintained. In this manner the rate of fuel flow to the combustion chamber is a function of the uncovered area of the first metering openings, and is independent of any pressure fluctuations in the system.

It is therefore a primary object of the present invention to provide fluid control valve apparatus and method which provides an extremely precise control of fluid flow independent of fluid pressure fluctuations.

More particularly, it is an object of the present invention to provide valve apparatus and method as set forth in previous object having low power consumption, low hysteresis and high contamination resistance, in a control system utilizable in adjusting rate of fuel flow to a gas turbine engine.

Another important object is to provide a clevis valve having a clevis that is mass-balanced about its pivot point to reduce sensitivity to vibration and shock loading.

These and other objects and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 2 is a perspective view of the position input linkage for the fuel control valve;

FIG. 3 is an enlarged perspective view of the metering post and clevis member controlling fuel flow to the combustion chamber;

FIG. 4 is a cross-sectional plan view of the metering post and clevis of FIG. 3;

FIG. 5 is a plan cross-sectional view of the bypass valve metering post, and showing portions of the associated clevis;

FIG. 6 is an enlarged cross-sectional view of the actuating means for the bypass flow control;

FIG. 7 is an enlarged cross-sectional view of the acceleration/deceleration scheduling control; and FIG. 8 is an enlarged cross-sectional view of portions of the input signal control.

DETAILED DESCRIPTION OF THE PREFERRED EMBODIMENT

Figure 1:
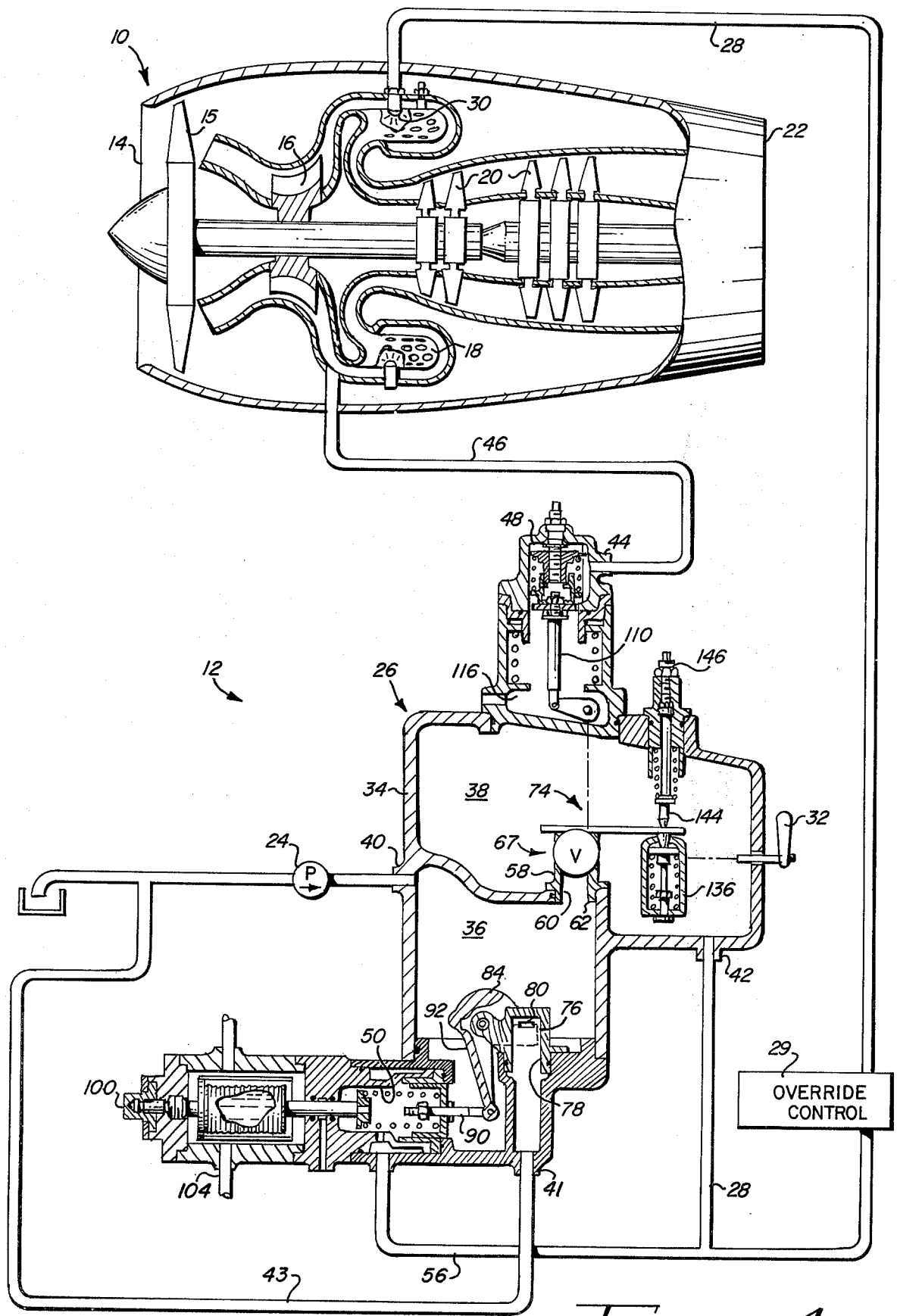
FIG. 1 is a partially cross-sectional, partially schematic illustration of the present invention as utilized in conjunction with the fuel control system of a gas turbine engine.

Referring now more particularly to the drawings, there is illustrated in FIG. 1 a gas turbine engine generally denoted by the numeral 10, along with a fluid fuel delivery system generally denoted by the numeral 12. Engine 10 generally includes a gas flow (normally ambient air) inlet 14, an inlet fan 15, and one or more compressor sections 16 which compress the inlet air flow and deliver it to a combustion chamber 18. The inlet gas flow from the compressor is then heated and delivered across one or more turbine stages 20 before existing through an exhaust nozzle 22. The turbines 20, being driven by the heated gas flow, drive the compressors 16 and fan 15. Depending upon the use of the gas turbine engine, output work is developed by rotation of the turbines, and/or by the resulting jet thrust imparted by exhaust of the accelerated gas flow through exhaust nozzle 22. In use as a power engine for aircraft, the primary forward thrust is developed by the exhaust of the accelerated gas through nozzle 22 and, in the case of a turbofan engine, also by exhaust of bypass gas flow generated by rotation of the inlet fan 15.

The fuel delivery system 12 includes a source of pressurized fuel in the form of a pump 24 normally operated by the engine, a control valve generally designated by the numeral 26 and a fluid delivery conduit 28 which delivers the liquid gas fuel flow to atomizer sprayers 30 into combustion chamber 18. Appropriate override controls 29 associated with conduit 28 can perform override functions by automatically blocking flow to the engine. Adjustment of an input lever 32 controls the rate of fuel flow delivered from the system 12 to combustion chamber 18 such that the turbine engine develops power or thrust in relation to the position of input lever 32.

Valve 26 includes a housing 34 having a pair of separate internal cavities 36 and 38. Housing 34 further includes an input port 40 communicating cavity 36 with the pump 24, an output port 42 communicating cavity 38 with fuel delivery conduit 28, a bypass port 41 communicating with the pump inlet through a bypass conduit 43, and a compressor discharge pressure input port 44 communicating through conduit 46 with the gas flow through engine 10 such that the pressure of gas being delivered to combustion chamber is transmitted to a third internal cavity 48 within housing 34. Housing 34 further defines a fluid receiving cylinder 50 having a movable diaphragm-type piston 52 disposed therein and traversing cylinder 50 to divide the latter into opposed chambers one of which, chamber 54, communicates with internal cavity 38 through an appropriate internal or external connecting conduit 56, while the chamber on the other side of piston 12 is exposed to inlet pressure in cavity 36.

Securely mounted within housing 34 is a first body member or metering post 58 having an internal fluid passage 60 communicating with housing internal cavity 36 through open end 62. The opposite end of metering post 58 is closed, and adjacent this closed end are a pair of opposed fluid metering openings 64, clearly illustrated in FIGS. 3 and 4, and substantially T shape. The opposed sides of metering post 58 have raised, circular faces 66 which may be of substantially harder and stronger material than the remainder of metering posts 58. The T metering openings 64 open onto raised faces 66.

A movable metering means 67 in the form of a bifurcated or clevis-like element 68 is pivotally attached at 70 to metering post 58. Clevis 68 is configured with a balancing mass 69 which places the center of mass of the entire clevis coincident with pivot 70 to render the clevis substantially insensitive to vibration and shock loading exerted thereon through housing 34. Clevis 68 has opposed portions 72 in registry with and slightly spaced from the metering openings 64 and raised faces 66. Rotation of clevis 68 about pivot 70 allows the portions 72 to variably cover and uncover openings 64. Further, the clevis arrangement 68 assures balanced flow from the opposed metering openings 64 such that the clevis is force-balanced at all times regardless of fluid flow through metering openings 64 to the other internal cavity 38. Actuating means generally denoted by numeral 74, described in greater particularity below, are effective to rotate clevis 68 about pivot 70.

Also mounted within housing 34 is a second body member in the form of a metering post 76 having an internal passage 78 communicating with bypass port 41 through the open end of metering post 76. At its other end metering post 76 includes a pair of opposed rectangular metering openings 80 on opposite sides thereof which open onto raised circular faces 82 similar to the raised faces of metering post 58.

A second movable metering means in the form of a bifurcated or clevis type element 84 is pivotally mounted at 86 to metering post 76 with opposed portions 88 in registry with and spaced apart from metering openings 80. Clevis 84 is configured with a mass 85 which balances the clevis relative to pivot 86 to substantially eliminate moments on the clevis otherwise induced by vibration and shock loading transmitted from housing 34. Rotation of clevis 84 about pivot 86 allows portions 88 to selectively cover and uncover metering openings 80 to vary the fluid communication between internal cavity 36 and bypass port 41.

Automatic actuation means are provided for moving clevis 84 and include a rod 90 directly connected to piston 52 and operably connected to clevis 84 through link arm 92 such that leftward movement of piston 58 uncovers openings 80, while opposite rightward movement of piston 58 tends to cover openings 80. Biasing means in the form of a spring 94 urges piston 52 rightwardly in conjunction with pressure in chamber 54 and against the pressure in internal cavity 36. Spring 94 reacts against a movable stop 96 which is connected through a liquid-filled bellows 98 with an external screw adjustment 100. Liquid-filled bellows 98 is disposed in an internal cavity 102 which communicates with the ambient gas flow to the inlet of the gas turbine engine through an appropriate port or ports 104. Bellows 98 is temperature responsive, contracting as the ambient temperature decreases to cause retraction of stop 96 and reduction of the biasing force of spring 94. Similarly, with increase in ambient temperature the bellows 98 expands increasing the biasing force exerted upon piston 52.

Being responsive to the fluid pressure differential across metering openings 64 by virtue of the communication with internal cavities 36 and 38 on opposite sides of piston 52, the piston 52 is operable to vary the position of metering portions 88 to control bypass flow from internal cavity 36 back to the inlet of the pump through conduit 43. This arrangement allows automatic movement of clevis 84 such that the fluid pressure differential across the metering openings 64 is maintained substantially constant. In this manner the rate of fuel flow delivered from pump 24 through internal cavity 36 and metering openings 64 to the other internal cavity 38 and output port 42 is a direct function of the area of openings 64 which are uncovered by metering portions 72, as well as the magnitude of the constant pressure differential maintained across openings 64. Thus for instance, upon a reduction of ambient gas flow temperature and contraction of bellows 98, the force of biasing spring 94 reduces, the pressure differential across openings 64 reduces, and rate of flow to the combustion chamber is accordingly reduced. Similarly, increase in ambient inlet flow gas temperature increases the rate of fuel flow to the combustion chamber.

The actuating means 74 for operating clevis 68 is clearly illustrated in FIG. 2. This actuation means includes an acceleration and deceleration scheduling diaphragm-type piston 106 which is biased downwardly by compressor discharge pressure in chamber 48, against the net upward urging of springs 108. A rod 110 connected to piston 106 has its lower end pivotally attached to a lever on 112 that is rotatable about shaft 114 pivotally mounted to housing 36. Rod 110, lever 112, and one end of shaft 114 are disposed in a fluid chamber 116 vented to the atmosphere such that movement of shaft 114 is responsive to the magnitude of the compressor discharge pressure. The opposite end of shaft 114 has firmly attached thereto a link arm 118 having a right angle stop arm 120 integrally formed therewith. Substantially parallel to arm 118 is another arm 122 pivotally attached at one end to housing 34 and pivotally connected to the outer end of parallel arm 118 through lost motion linkage 124. This second parallel arm 122 also has a right angle stop arm 126. Stop arms 120 and 126 are respectively engagable with the upper and lower surfaces of the left arm 128 attached to clevis 68.

Extending oppositely from clevis 68 is another arm 130 biased downwardly by spring 132 and biased upwardly by opposite spring 134. Spring 134 is retained within a casing 136 operably attached to input level 32 through a curved arm 138 and a shaft 140 pivotally mounted to housing 34. Spring 134 reacts against casing 136 to urge a dish-like shoulder 142 against clevis arm 130. Spring 132 urges a rod 144 downwardly against arm 130. Maximum upward movement of arm 130 can be adjusted by rotation of external screw 146 to adjust the position of the lower face of stop sleeve 148. Adjusting screws 150 and 152 control the limit of the pivoting stroke of input shaft 140.

In operation, the engine draws in ambient gas flow through its inlet 14 to be compressed by the various compressor stages 16 prior to introduction into combustion chamber 18. The compressor discharge pressure is sensed in chamber 48 of valve 26. Pump 24 delivers liquid fuel through input port 40 to internal cavity 36 of the control valve. The fluid fuel flow then divides, a controlled portion passing through metering openings 64 into internal cavity 38 to discharge through output port 42 and through fluid delivery conduit 28 to the combustion chamber. The remaining fuel flow in internal cavity 36 passes through the other metering openings 80 to bypass port 41 and the inlet of the pump in bypassing relationship to the combustion chamber. Through both pairs of metering openings 64 and 80, there is provided balanced fluid flow by virtue of operation of the respective clevises 68 and 84. Further, the close but non-contacting relationship of the respective metering portions 72 and 88 of the clevises relative to the associated raised faces 66 and 88 provides self-cleaning action of each of the control orifices as well as balanced force action upon the respective clevises. The fluid pressure differential across metering openings 64 is sensed and impressed across piston 52 such that clevis 84 is positioned to control bypass flow so as to maintain a substantially constant pressure differential across metering openings 64. Accordingly, the rate of fuel flow to the combustion chamber is a direct, repetitive function of the uncovered area of metering openings 64 and is independent of any pressure fluctuations in the fuel delivery system and/or the speed of operation of pump 24. The ambient air temperature is sensed by the movable bellows 98 to vary the rate of fuel flow delivered to the combustion chamber as a function of the ambient air temperature as discussed above.

The position of clevis 68 is determined by the input signal to position input lever 32. If, for instance, input lever 32 is shifted to its maximum flow position in engagement with stop 152, the curved arm 138 and casing 136 shift generally downwardly in FIG. 2 such that the actions of spring 132 and 134 tend to pivot clevis 68 clockwise about its pivot 70 to further uncover openings 64 and increase fuel flow. However, movement of clevis 68 in this fuel-flow-increasing direction is limited by the stop arm 120 in engagement with the upper surface of left hand arm 128. As compressor discharge pressure increases, piston 106 is shifted downwardly producing a counter-clockwise rotation of arm 118 to raise arm 120 and allow clevis 68 to pivot and increase the rate of fuel flow to the combustion chamber. Accordingly, it will be seen that upon requesting greater fuel flow through the engine for acceleration, the actual increase in fuel flow is controlled by compressor discharge pressure such that the acceleration schedule will not bring the turbine engine into stall or surge condition.

Similarly upon shifting input lever 32 toward a lower flow condition to decelerate the engine, casing 136 is shifted upwardly to urge clevis 68 to pivot counter-clockwise about its pivotal connection 70. This counter-clockwise movement of clevis 68 is limited, however, by the engagement of stop arm 126 with the lower surface of left hand arm 128. As compressor discharge pressure reduces in chamber 48, piston 106 shifts upwardly causing clockwise rotation of arms 118, 122 and downward movement of transverse stop arm 126 to permit controlled counter-clockwise movement of clevis 68 to reduce the area of openings 64 open to internal cavity 38. In this manner, the piston 106 automatically schedules change in rate of fuel flow through deceleration so as to prevent combustor flame-out. With lever 32 engaging stop 150, clevis 68 is in its minimum flow position for engine starting, with upward movement of rod 144 limited by contact with stop sleeve 148.

Throughout the entire operation of the lever arm 32 and linkage 74, the second clevis 84 is operable to automatically vary bypass fuel flow from internal cavity 36 through passage 43 back to the inlet of the pump to maintain a substantially constant pressure differential across the metering openings 64. Also throughout operation of the engine, override controls 29 which may be responsive to a variety of engine operating parameters, are automatically operable to vary or shut off fuel flow through fuel delivery conduit 28.

It will thus be apparent that the present invention provides an improved fuel control structure and method of compact, economical configuration which provides a repetitive, highly precise control of fuel flow to a gas turbine engine. The arrangement of a pair of clevis valves 68 and 84 allows convenient adjustment of the valves to compensate for external parameters. For instance, because the rate of fuel flow to the engine is directly a function of the position of clevis 68 and is independent of pressure, speed or other parameter fluctuations, the present invention permits direct mechanical linkage between the acceleration adjustment scheduling piston 106 and clevis 68. Linkage 74 in most instances will be designed to the particular operating parameters of a given gas turbine engine, and different acceleration and deceleration schedules can be easily incorporated in the valve simply by utilization of lost motion linkage 124 which creates different controlled rotation of clevis 68 in opposite directions, i.e., different clockwise and counter-clockwise rotation of the arms 118, 122 and clevis 68. The mechanical linkage 74 can therefore be designed quite near the surge line of the gas turbine engine on acceleration. Dependent upon the characteristics of engine 10, different acceleration and deceleration schedules may not be necessary, in which case linkage 122 and 124 can be eliminated, and arm 126 affixed to link 118. The arrangement further allows adjustment of the fuel flow relative to other external parameters. For instance the liquid filled bellows 98 operating directly upon spring stop 96 allows convenient adjustment of fuel flow relative to ambient temperature. Similarly, the liquid filled bellows 98 could be replaced by an evacuated, gas carrying chamber to provide an altitude or ambient pressure responsive adjustment. Adjustment screw 100 acting directly through the positive mechanical interconnection of liquid filled bellows 98 with stop 96 allows direct manual adjustment of the spring rate of spring 94 and thus the magnitude of the pressure differential across openings 64 to alter the controlled rate of fuel flow to the engine. In this manner screw 100 can be adjusted relative to the specific gravity of fuel being utilized in the engine so that the engine has multiple fuel capabilities. Adjustment of the desired rate of fuel flow to the engine during starting is accomplished simply by adjustment of screw 146 to advance or return stop sleeve 148 to establish minimum fuel flow. As necessary, the fuel control may be made responsive to other engine parameters such as engine speed by incorporation of appropriate controls associated with input lever 32. For instance, an engine speed responsive control can be incorporated simply by utilizing a governor control for positioning input lever 32.

From the foregoing it will be apparent that the present invention provides an improved method of controlling fluid flow from a source of pressurized fluid to an outlet port 42, as well as a method of controlling fuel flow to a gas turbine engine which includes the steps of directing fluid flow from the pump through the first opposed metering openings 64 and on to the gas turbine engine combustion chamber. In parallel flow arrangement, fluid flow from the source is directed through a second pair of opposed metering openings 80 in bypassing relationship to the outlet port back to the inlet of the pump. The fluid pressure differential is sensed across the first metering openings and utilized to automatically position the clevis 84 so as to maintain a substantially constant fluid pressure differential across metering openings 64. All this is accomplished while maintaining balanced flow through both the metering openings 64 and 80 to minimize effort required in moving clevises 68 and 84 and to produce the inherent self-cleaning feature, while providing low hysteresis and inherently good frequency response of the metering valves. The clevis-like arrangement allows the valves to be designed in balance relative to vibration and shock loading.

The configuration of each of the clevis valves 68 and 84 assures that the fluid pressure between the respective metering posts and the clevises are equally balanced so that the clevises 68 and 84 will remain precisely centered on the metering post with no physical contact with the circular raised faces associated therewith. This automatic centering feature permits the clearance between the associated portions 72 and 80 of the clevises and the adjacent raised portions of the metering posts to be very small, on the order of 0.0002 inches. Economical, simple manufacture is afforded by the described configurations since only the relatively small-area raised faces on the metering posts and adjacent metering portions on the clevises need to be precisely machined. The remainder of both the metering posts and the clevises can be straight-forward castings, of greatly simplified design in comparison to prior art structure.

Preferably, the raised surfaces 66 and 88 may be of different, high strength material than the remainder of the respective metering posts. The rate of fuel flow to the turbine engine can be any desired function of the movement of associated clevis 68, either a continuous or discontinuous function of the position of clevis 68, simply by altering the configuration of the metering openings 64 and 88.

The arrangement of clevises 68 and 84 presents raised areas 66 and 82 of substantially smaller slide area than prior art devices. Bernoulli forces acting upon the valves are, in practicality, eliminated. Cost reduction is afforded, in addition to the previous reasons stated, by elimination of any cross-drilled holes and by reduction in the number of sealing elements required.

While a preferred arrangement of the invention has been set forth in detail, various modifications and alterations will be apparent to those skilled in the art. Accordingly, the foregoing detailed description should be considered exemplary in nature and not as limiting to the scope and spirit of the invention as set forth in the appended claims.

Having described the invention with sufficient clarity that those skilled in the art may make and use it, I claim:

1. A fluid control valve comprising:
   a housing having a pair of internal cavities respectively communicating with a fluid pressure inlet port and a fluid pressure outlet port;
   a pair of body members in said housing each having a fluid passage therein and being open at one end and having a pair of opposed metering openings at the other end communicating with said passage, the open end of one of said body members communicating with one of said cavities and the opposed metering openings of the other of said body members also communicating with the one of said internal cavities;
   a pair of movable metering means respectively associated with each of said body members having portions in registry with the associated metering openings and spaced apart from the associated body members for covering and uncovering said metering openings in response to movement of said metering means, each of said metering means arranged to provide balanced flow from the associated metering openings;
   actuation means for moving one of said metering means; and
   automatic actuation means responsive to the fluid pressure differential established across the metering openings associated with said one metering means for automatically moving the other of said metering means.

2. A fluid control valve comprising:
   a first body member having a fluid passage therein open at one end for communicating with a source of pressurized fluid, said body member having first opposed metering openings at the other end communicating with the passage, said first metering openings arranged to communicate with a fluid outlet port;
   first movable metering means associated with said first body means for covering and uncovering said first metering openings in response to movement of said first metering means, said first metering means arranged to provide balanced flow from said first metering openings;
   actuation means for moving said first metering means;
   a second body member having an associated fluid passage therein and being open at one end for communicating with a fluid exhaust port, said second body member having second opposed metering openings at the other end thereof arranged to communicate with said inlet port;
   a second movable metering means movable to cover and uncover said second metering openings, said second metering means arranged to provide balanced flow through said second metering openings; and fluid pressure responsive means for moving said second metering means in response to the pressure differential across said first metering openings to provide a substantially constant pressure differential across said first metering openings.

3. A method of controlling fluid flow from a source of pressurized fluid to a fluid outlet port, comprising the steps of:

directing fluid flow from said source through a first pair of opposed metering openings to said outlet port;

adjustably covering and uncovering said first metering openings while providing balanced flow therethrough;

directing flow from said source through a second pair of opposed metering openings to an exhaust port in parallel flow arrangement to said flow through said first metering openings;

sensing the fluid pressure differential across said first metering openings; and automatically adjustably covering and uncovering the second metering openings in response to the magnitude of said sensed fluid pressure differential to control fluid flow from said source to said exhaust port in a manner maintaining a substantially constant pressure differential across said first metering openings, while providing balanced flow through said second metering openings.

4. A method of controlling fuel flow to the combustion chamber of a gas turbine engine, comprising the steps of:

directing fluid flow from a source of pressurized fluid through a pair of opposed metering openings to the combustion chamber;

directing fuel flow from said source through a second pair of fluid metering openings to a low pressure bypass port in parallel flow arrangement to said flow through said first metering openings;

sensing the fluid pressure differential across said first metering openings;

automatically covering and uncovering said second metering openings in response to the magnitude of the sensed of fluid pressure differential to vary fluid flow from said source to said bypass port to maintain a substantially constant fluid pressure differential across said first metering openings; and maintaining substantially balanced flow through both said first pair of metering openings and said second pair of metering openings.

5. A method as set forth in claim 4, further including the step of selectively covering and uncovering said first metering openings to adjust the rate of fuel flow to the combustion chamber.

6. In combination:

a gas turbine engine having a combustion chamber;

fuel delivery means including a source of pressurized fluid fuel for delivering fuel to said combustion chamber;

a control valve having an inlet port communicating with said source of pressurized fuel, an outlet port communicating with said combustion chamber, and a bypass port for returning fuel flow from said control valve to said fuel delivery means in bypassing relationship to said combustion chamber;

means defining a first pair of opposed metering openings in communication with said inlet port whereby fuel flow from said source flows through said first metering openings to said outlet port and said combustion chamber;

means defining a second pair of opposed metering openings communicating with said inlet port and said bypass port whereby bypass fuel flow from said inlet port to said bypass port passes through said second metering openings;

movable means for selectively covering and uncovering said second pair of metering openings to alter the rate of bypass fuel flow therethrough, said movable means operable to provide balanced flow through said second pair of openings;

actuating means operably engaging said movable means and responsive to the fluid pressure differential across said first pair of metering openings for shifting said movable means to vary bypass fluid flow through said second metering openings in a manner maintaining a substantially constant pressure differential across said first metering openings; and means providing balanced fuel flow through said first pair of metering openings.

7. A combination as set forth in claim 5, wherein said means providing balanced flow through said first metering openings includes a movable metering member shiftable to cover and uncover said first metering openings to precisely adjust rate of fuel flow through said outlet port to said combustion chamber.

8. A combination as set forth in claim 7, wherein said gas turbine engine includes a compressor for compressing and delivering pressurized gas flow to said combustion chamber, and further including means responsive to compressor discharge pressure and operably engagable with said metering member for controlling movement thereof in relation to said compressor discharge pressure.

9. A combination as set forth in claim 6, further including means operably engagable with said actuating means for adjusting the magnitude of said substantially constant fluid pressure differential across said first metering openings.

10. A combination as set forth in claim 9, wherein said actuating means includes a piston traversing and movably disposed within a fluid pressure cylinder in said control valve to divide said cylinder into first and second pressure chambers on opposite sides of the piston, said first and second chambers respectively communicating with said inlet port and said outlet port, and further including means biasing said piston in a direction assisting the force exerted by fluid pressure in said outlet port upon said piston.

11. A combination as set forth in claim 10, wherein said engine includes a compressor for compressing and delivering pressurized gas flow to said combustion chamber, said actuating means further including means responsive to the ambient pressure of gas delivered to the inlet of said compressor for adjusting the force exerted by said biasing means in relation to said ambient pressure.

12. In combination with a gas turbine engine having a compressor for receiving ambient gas flow and delivering gas at an elevated pressure to a combustion chamber, said engine having a source of pressurized fluid fuel:

a housing having an inlet port communicating with said source of pressurized fuel, an outlet port communicating with said combustion chamber, a bypass port operably communicating with the inlet of said source of pressurized fuel in bypassing relationship to said combustion chamber, a gas pressure port communicating with the discharge flow from said compressor, said housing having first, second, and third internal cavities respectively communicating with said inlet port, said outlet port, and said gas pressure port, said housing further defining a fluid cylinder;

a first body having an open end communicating with a passage therein, said first body disposed in said housing with said open end communicating with said first cavity, said first body having a first pair of opposed metering openings at the other end thereof communicating with said passage and said second cavity;

a first bifurcated metering element pivotally mounted in said housing with opposed bifurcated portions thereof in registry with and spaced apart from said first pair of opposed metering openings and arranged relative thereto to provide balance flow through said first pair of metering openings;

first actuating means for oppositely rotating said first metering element to vary fluid flow through said first metering openings to said second cavity;

gas pressure responsive means communicating with said third cavity and operably engageable with said first actuating means, said gas responsive means responsive to compressor discharge pressure for controlling rotation of said first actuating means;

a second body having a fluid passage therein and being open at one end and having second opposed metering openings at the other end thereof communicating with said passage, said second body element disposed in said housing with said open end communicating with said bypass port and said second opposed metering openings communicating with said first cavity;

a second movable bifurcated metering element pivotally mounted in said housing with bifurcated sections thereon in registry with and spaced apart from said second opposed metering openings and arranged relative thereto to provide balanced flow through said second metering openings;

a piston traversing said fluid cylinder to divide the latter into first and second pressure chambers respectively communicating with said first and second cavities;

spring means operably engaging said piston to exert a force shifting the latter in a direction assisting fluid pressuring in said second cavity;

a second actuating element operably coupled with said piston and said second bifurcated metering member for pivoting the latter in relation to the fluid pressure differential across said first metering openings to vary fluid flow through said second metering openings in a manner maintaining a substantially constant pressure differential across said first metering openings; and means for adjusting the force of said spring means to adjust the magnitude of said substantially constant fluid pressure differential maintained across said first metering openings.

13. A combination as set forth in claim 12, wherein said gas pressure responsive means includes linkage operably engageable with said first metering element for providing different controlled rotation of said first actuating means in opposite directions.

14. A combination as set forth in claim 12, wherein each of said bifurcated members are configured whereby their centers of mass are substantially coincident with the respective pivotal connections to said housing such that said bifurcated members are substantially insensitive to shock loading and vibration transmitted thereto from said housing.

15. A fluid control valve comprising:
a body member subject to vibration and shock loading and having a fluid passage therein, said passage being open at one end and having opposed metering openings at the other end communicating with said passage;

metering means operably pivotally mounted to said body member and having portions in registry with said metering openings and spaced apart from said body member for covering and uncovering said metering openings, said metering means being arranged to provide balanced flow through said metering openings; and actuation means for pivoting said metering means about its pivotal mounting in response to control signals, said metering means being configured with its center of mass coincident with said pivotal mounting whereby said metering means is insensitive to said vibration and shock loading.

* * * * *